3,337,576
ARYLTHIOALKYLTETRAZOLES
Ronald Leslie Buchanan, Fayetteville, and Richard Anthony Partyka, Liverpool, N.Y., assignors to Bristol-Myers Company, New York, N.Y., a corporation of Delaware
No Drawing. Filed Jan. 20, 1966, Ser. No. 521,810
11 Claims. (Cl. 260—308)

This invention relates to novel compounds. More particularly, this invention relates to novel compounds which possess valuable therapeutic utility as hypocholesterolemic agents and to processes useful in the preparation thereof.

It is an object of this invention to provide a new class of therapeutic compunds. It is another object of this invention to provide novel compounds having hypocholesterolemic activity. It is a further object of the present invention to provide a process for preparing the novel therapeutic compounds.

These and other objects which may appear as the specification proceeds are achieved by this invention which comprises the provision of compounds selected from the group consisting of compounds having the following formula I 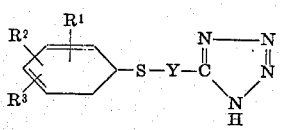

wherein $R^1$, $R^2$ and $R^3$ each represent a member selected from the group consisting of hydrogen, chloro, bromo, fluoro, iodo, trifluoromethyl, (lower)alkyl, (lower)alkoxy, (lower)alkylthio, di(lower)alkylamino, di(lower)alkylamino(lower)alkoxy, nitro, phenyl, phenoxy and benzyl, and Y is (lower)alkylene, and their S-oxides and S-dioxides; and the pharmaceutically acceptable nontoxic salts thereof.

The pharmaceutically acceptable nontoxic salts of the compounds of this invention include the nontoxic metallic salts such as sodium, potassium, calcium, aluminum and the like, the ammonium salt and substituted ammonium salts, e.g. salts of such nontoxic amines as trialkylamines, including triethylamine, procaine, dibenzylamine, N-benzyl-β-phenethylamine, 1-ephenamine, N,N'-dibenzylethylenediamine, dehydroabietylamine, N,N'-bis-dehydroabietylethylenediamine, N-(lower)alkylpiperidines, e.g. N - ethylpiperidine, morpholine, dimethylamine, methylcyclohexylamine, glucosamine and other amines which have been used to form salts with benzylpenicillin. The salts of the compounds of this invention are prepared by conventional procedures described in the chemical literature.

The term "(lower)alkyl" as used herein means both straight and branched chain aliphatic hydrocarbon radicals having from 1 to 8 carbon atoms, e.g. methyl, ethyl, propyl, isopropyl, butyl, isobutyl, sec-butyl, t-butyl, amyl, 2-ethylhexyl, octyl, etc.

The term "(lower)alkylene" as used herein means both straight and branched chain alkylene radicals having from 1 to 8 carbon atoms, e.g. methylene, ethylene, propylene, isopropylene, butylene, isobutylene, t-butylene, amylene, hexylene, 2-ethylhexylene, methylmethylene, dimethylmethylene, etc.

Similarly, when the term "(lower)" is used as part of the description of another group, e.g., (lower)alkoxy, it refers to the alkyl portion of such group which is therefore as described in connection with (lower)alkyl.

A preferred group of compounds of the present invention are those of Formula I wherein $R^1$, $R^2$ and $R^3$ each represent a member selected from the group consisting of hydrogen, chloro, bromo, fluoro, iodo, trifluoromethyl, (lower)alkyl, (lower)alkoxy and nitro.

The compounds of this invention have a high degree of hypocholesterolemic activity, making them potent hypocholesterolemic agents, and are useful for lowering serum cholesterol.

Hypocholesterolemic tests of the compounds of the present invention were carried out by administering the compounds (suspended in 0.5% carboxymethyl cellulose solution) at a dose of 400 mg./kg. p.o. to rats once daily for 4 days. The control rats were tested similarly with the same volume dose of 0.5% carboxymethyl cellulose only. Starting the evening of the fourth day, the rats were fasted. On the fifth day, the serum of the treated rats and control rats was analyzed for cholesterol, and the cholesterol content compared. The result is expressed as the percentage decrease in serum cholesterol.

In the test described above, a preferred compound of the present invention having the formula II 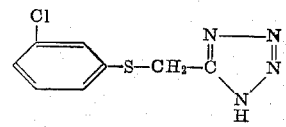

gave the following percentage decrease in serum cholesterol at the dosages in mgm./kg. given in parentheses: 40 (400), 28 (200), 16 (100). This compound has an $LD_{50}$ (oral) of 2100 mg./kg. in the rat. Thus, this compound is a very potent hypocholesterolemic agent.

The compounds of the present invention corresponding to Formula I are preferably prepared as exemplified below by reacting a nitrile of the formula III 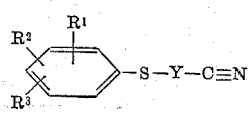

wherein $R^1$, $R^2$, $R^3$ and Y are as described above, with at least an equimolar weight of an azide and preferably an inorganic azide, e.g. sodium azide, lithium azide, tetramethyl ammonium azide, trimethylammonium azide, ammonium azide, aluminum azide, morpholinium azide, piperidinium azide or hydrazoic acid, in a liquid (and preferably anhydrous) medium for at least 12 hours at temperatures above room temperature and preferably in the range of about 80° C. to about 140° C. If desired, there may be added at as catalyst a Lewis acid, e.g. boron trifluoride-etherate, tetra-alkylammonium chlorides, aniline hydrochloride, ammonium chloride, lithium chloride. Suitable liquid media includes the monomethyl and ethyl ethers of ethylene and diethylene glycol and tetrahydrofuran, n-butanol and particularly dimethyl sulfoxide and dimethylformamide. The axidic compound may be added per se or prepared in situ. In particular, use may be made of the procedures of United States Patents 2,977,372, 3,155,666, 3,123,615 and those given by McManus et al., J. Org. Chem., 24, 1464 (1949); Finnegan et al., J. Amer. Chem Soc., 80 3908–3911 (1958); F. R. Benson, Chem. Rev., 41, 1 (1947); or in E. H. Rodd, Chemistry of Carbon Compounds, IV, 481–486, D. H. Van Nostrand Co. Inc., New York, N. Y. (1957); or in the references cited therein for the preparation of 5-substituted tetrazoles.

The S-dioxides of this invention have the following formula

IV
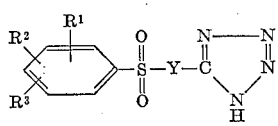

wherein $R^1$, $R^2$, $R^3$ and Y are as described above, and are prepared by the oxidation of a tetrazole of Formula I with an oxidizing agent such as hydrogen peroxide at elevated temperatures.

The S-oxides of this invention have the following formula

V
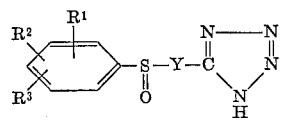

wherein $R^1$, $R^2$, $R^3$ and Y are as described above, and are prepared by a procedure similar to that described above in connection with the preparation of the S-dioxides, except that the oxidation is carried out under milder conditions, i.e., lower temperature and preferably room temperature.

The nitriles of Formula III are compounds which are either commercially available, well known in the art, or easily prepared in accordance with standard organic procedures previously described in the chemical literature. For example, various nitriles are described in United States Patent No. 2,953,567, and by R. Dijkstra and H. J. Backer, Rec. Trav. Chim., 73, 569 (1954).

The nitriles of Formula III can be conveniently prepared by the following reaction schemes:

(a)
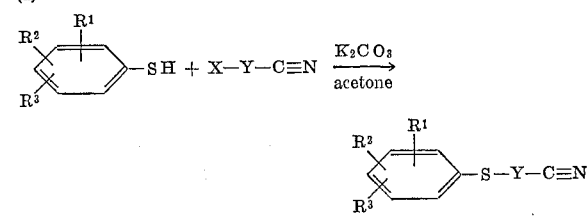

(b)
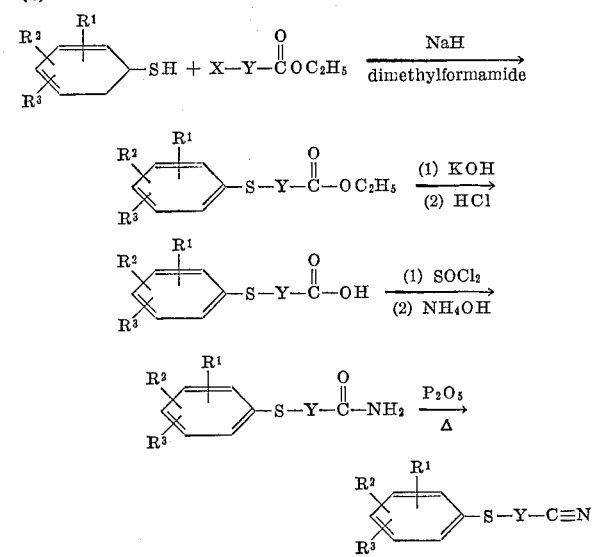

c)
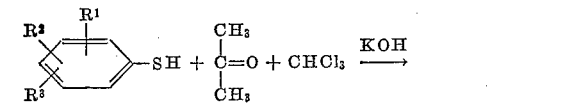

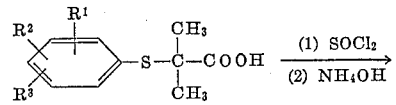

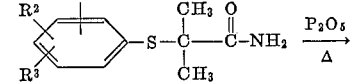

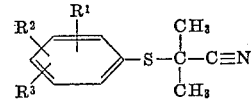

(d)
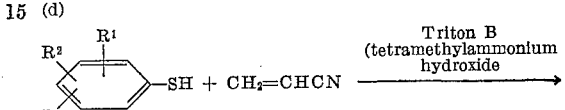

wherein $R^1$, $R^2$ and $R^3$ and Y are as described above, and X is chloro or bromo.

Some of the compounds of the present invention contain as asymmetric carbon atom, and thus normally occur as a racemic mixture of the two optical isomers. Both isomers are active, and both of these isomers and mixtures thereof are included within the scope of the present invention. The individual isomers are prepared in pure form from a racemic mixture by resolution with an optically active amine, e.g. D-amphetamine, dehydroabietylamine, yohimbine, by the procedure used on other acids, e.g., α-phenoxypropionic acid.

The compounds of this invention are acidic and may be administered in their free form or in the form of their non-toxic salts. They may be compounded and formulated into pharmaceutical preparations in unit dosage form for oral or parenteral administration with organic or inorganic solid materials or liquids which are pharmaceutically acceptable carriers. The compositions may take the form of tablets, powder granules, capsules, suspensions, solutions and the like. Such compositions are considered within the scope of this invention.

The compositions of this invention when administered orally or parenterally, in an effective amount, are effective in lowering serum cholesterol.

The following examples are intended to illustrate the invention described herein without unduly restricting it.

EXAMPLES

A. *Preparation of intermediates*

EXAMPLE A-1.—PREPARATION OF α-(4-CHLOROPHENYLTHIO)ISOBUTYRONITRILE

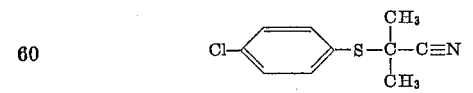

(a) *Ethyl α-(4-chlorophenylthio)isobutyrate.*—Sodium hydride (58.6% dispersion in mineral oil, 31.8 gm., equivalent to 0.78 mol of 100% NaH) was added portionwise with stirring to a cooled solution of p-chlorothiophenol (107 gm., 0.74 mol) in 300 ml. of dry dimethylformamide. The ice bath was then removed until all of the sodium hydride had reacted. The reaction mixture was again cooled and ethyl α-bromoisobutyrate (151.6 gm., 0.78 mol) was added dropwise, allowing the temperature of the mixture to rise to 45° C. during the addition. Stirring at 40° C. was continued for an hour whereupon the mixture was poured into 600 ml. of cold water. The solid was filtered, dried and recrystallized from absolute ethanol, yielding 144.0 gm. of pure product (M.P. 44–47° C.).

(b) *α-(4-chlorophenylthio)isobutyric acid.*—A solution of ethyl α-(4-chlorophenylthio)isobutyrate (122.8 gm., 0.475 mol) in 1250 ml. of absolute ethanol to which there was added a solution of potassium hydroxide (29.3 gm., 0.52 mol) in 62 ml. of water was refluxed for 1½ hours. The ethanol was removed by evaporation under reduced pressure and the residual potassium salt was dissolved in 750 ml. of water and acidified with 55 ml. of concentrated hydrochloric acid. The precipitated acid was filtered, washed with water and dried by dissolving it in chloroform over anhydrous sodium sulfate. Removal of the solvent afforded 107.4 gm. of the white crystalline acid (M.P. 95.5–99.5° C.).

(c) *α-(-4-chlorophenylthio)isobutyramide.*—A solution of α-(4-chlorophenylthio)isobutyric acid (107.4 gm., 0.465 mol), benzene (400 ml.) and thionyl chloride (113 gm., 0.949 mol) was refluxed for 1 hour. The excess thionyl chloride and benzene were removed by evaporation under reduced pressure, leaving a light brown oil. Distillation yielded the acid chloride (67.1 gm.) as a colorless oil, (B.P. 124–133° C./0.25 mm.).

The acid chloride (67.1 gm., 0.27 mol) was poured with stirring into 600 ml. of concentrated ammonium hydroxide solution. The precipitated solid was filtered, washed with water and crystallized from isopropyl alcohol. Ammonium chloride was removed from the resultant solid product by dissolution in chloroform and removing the insoluble salt by filtration. After removal of the solvent, 54.8 gm. of the product was obtained (M.P. 104.5–108.5° C.). Recrystallization from isopropyl alcohol gave the pure material (M.P. 106–109° C.).

(d) *α - (4-chlorophenylthio)isobutyronitrile.* An intimate mixture of α-(4-chlorophenylthio)isobutyramide (51.1 gm., 0.22 mol) and excess phosphorus pentoxide was heated under high vacuum in a distillation apparatus. The product (37.0 gm.) distilled as a pale yellow oil (B.P. 91–120° C./0.2–0.5 mm.) which crystallized upon cooling. Recrystallization from "Skellysolve B" (petroleum solvent, B.P. 60–68° C., essentially n-hexane) afforded colorless needles of the pure product, α-(4-chlorophenylthio)isobutyronitrile (M.P. 51.5–53.5° C.).

*Analysis.*—Calcd. for $C_{10}H_{10}ClNS$: C, 56.73%; H, 4.76%; Cl, 16.75%; N. 6.62%. Found: C, 56.28%; H, 4.70%; Cl, 16.80%; N, 6.17%.

EXAMPLE A–2.—PREPARATION OF PHENYLTHIO-ACETONITRILE

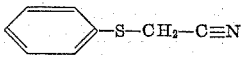

To a cooled solution of thiophenol (30.3 gm. 0.275 mol) in methanol (75 ml.) there was added portion-wise freshly cut sodium (0.25 gm.-oil; 5.7 gm.) while the solution was being stirred. After all of the sodium was dissolved, there was added dropwise and with stirring, chloroacetonitrile (18.9 gm., 0.25 mol). After the addition was completed, the mixture was stirred for 2 hours at room temperature. The resulting sodium chloride was suction-filtered off and washed with ether. The solvents (ether, methanol) were removed from the combined filtrates under water aspirator pressure and the residue distilled under high vacuum to give 31.3 gm. of the product, phenylthioacetonitrile, as a colorless oil (B.P. 118–123° C./0.4 mm.)

EXAMPLE A–3.—PREPARATION OF α-(4-CHLORO-PHENYLTHIO)PROPIONITRILE

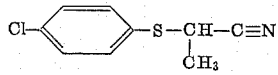

(a) *Ethyl - (4 - chlorophenylthio)propionate.*—Sodium hydride (58.6% dispersion in mineral oil, 31.8 gm. equivalent to 0.777 mol of 100% NaH) was added portion-wise and with stirring to a solution of p-chlorothiophenol (107 gm. 0.74 mol) in 300 ml. of dry dimethylformamide while the reaction vessel was immersed in an ice bath. The ice bath was then removed until all of the sodium hydride had reacted. The reaction mixture was again cooled in a nice bath and ethyl α-bromopropionate (140.7 gm., 0.777 mol) was added dropwise, allowing the mixture to warm to 45° C. during the addition. After stirring at 40° C. for an additional hour, the mixture was poured into 600 ml. of cold water, and extracted three times with ether. The ether extracts were dried over anhydrous sodium sulfate followed by evaporation of the ether. The residual oil was distilled, affording 151.3 gm. of the product as a light yellow oil (B.P. 127–130° C. at 0.65 mm.).

(b) *α-(4-chlorophenylthio)propionic acid.*—To a solution of ethyl α-(4-chlorophenylthio)propionate (139.7 gm., 0.571 mol) in 1400 ml. of absolute ethanol was added a solution of potassium hydroxide (35.23 gm., 0.628 mol) in 70 ml. of water. The resulting solution was refluxed for 2½ hours. After evaporation of the ethanol, the potassium salt was dissolved in 1000 ml. of water, and the solution acidified with concentrated hydrochloric acid. The precipitated acid was filtered, washed with water, and dried by dissolving in chloroform over anhydrous sodium sulfate. Exaporation of the chloroform gave 118.5 gm. of the product acid as white crystals. Two recrystallizations from carbon tetrachloride gave the pure acid (M.P. 103–104.5° C.).

*Analysis.*—Calcd. for $C_9H_9ClO_2S$: C, 49.89%; H, 4.19%; Cl, 16.36%; S, 14.80%. Found: C, 49.67%; H, 4.18%; Cl, 16.20%; S, 14.66%.

(c) *α - (4-chlorophenylthio)propionamide.*—α-(4-chlorophenythio)propionic acid (108.5 gm., 0.50 mol) and thionyl chloride (350 ml.) were refluxed for 3 hours. The excess thionyl chloride was evaporated in vacuo and two 100 ml. portions of benzene were added and evaporated in turn. The residue was poured into concentrated ammonium hydroxide solution (700 ml.). The resultant solid product, obtained in quantitative yield, was recrystallized twice from isopropyl alcohol to give the pure amide (M.P. 126–128° C.).

*Analysis.*—Calcd. for $C_9H_{10}ClNOS$: C, 50.11%; H, 4.67%; Cl, 16.44%; N, 6.49%; S, 14.86%. Found: C. 49.99%; H, 4,87%; Cl, 16.37%; N, 6.52%; S, 14.97%.

(d) *α-(4-chlorophenylthio)propionitrile.*—An intimate mixture of α-(4-chlorophenylthio)propionamide (23.5 gm., 0.109 mol) and phosphorus pentoxide (23.5 gm. was heated under high vacuum and the product distilled as a colorless liquid (18.7 gm., B.P. 95–97° C. at 0.35 mm.) which solidified upon cooling (M.P. 44.5–47° C.). Recrystallization from "Skellysolve B" afforded the product, α-(4-chlorophenylthio)propionitrile (M.P. 46–47° C.).

*Analysis.*—Calcd. for $C_9H_8ClNS$: C, 54.86%; H. 4.08%; N, 7.08%. Found: C, 55.00%; H, 4.27%; N, 6.81%.

EXAMPLE A–4.—PREPARATION OF α-(4-BROMO-PHENYLTHIO)ISOBUTYRONITRILE

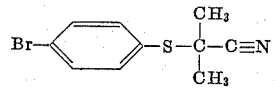

(a) *Ethyl α-(4-bromophenylthio)isobutyrate.*—Sodium hydride dispersion (13.5 gm. of 58.6% NaH, equivalent to 0.33 mols of 100% NaH) was added in portions to a stirred and cooled solution of p-bromothiophenol (58.0 gm., 0.314 mol) in 150 ml. of dry dimethylformamide, not allowing the reaction temperature to rise above 15° C. Stirring was continued at 10° C. for 20 minutes and then at 15–20° C. for 10 minutes to complete enolate formation. Ethyl α-bromoisobutyrate (64.4 gm., 0.33 mol) was then added dropwise, allowing the reaction temperature to rise to 55° C. After stirring at 40° C. for a further hour, the mixture was poured into 200 ml. of cold water. An oil separated which was extracted into ether.

The ether extracts were then washed three times with water and dried over anhydrous magnesium sulfate. Evaporation of the ether gave the product as a light yellow oil which crystallized upon cooling. A nearly quantitative yield of solid ester was obtained (M.P. 43–48° C.).

(b) α - (4 - bromophenylthio)isobutyric acid.—Crude ethyl α-(4-bromophenylthio)isobutyric acid (96.0 gm., 0.31 mol) was dissolved in 600 ml. of absolute ethanol, and a solution of potassium hydroxide (19.6 gm., 0.35 mol) in 40 ml. of water was added. After refluxing for 1½ hours, the bulk of the ethanol was removed by evaporation in vacuo, 250 ml. of water was added to the residue, and the solution acidified with concentrated hydrochloric acid. The precipitated acid was filtered, washed with water and dried by dissolving it in chloroform over anhydrous magnesium sulfate. Removal of the chloroform afforded 85.5 gm. of the crystalline product in quantitative yield. It was converted to the amide without further purification.

(c) α-(4-bromophenylthio)isobutyramide.—The crude α-(4-bromophenylthio)isobutyric acid (85.5 gm., 0.31 mol) was refluxed with 250 ml. of thionyl chloride for 3 hours. The excess thionyl chloride was removed by distillation, followed by addition of benzene and evaporation in vacuo. The crude acid chloride was then poured into 500 ml. of cold concentrated ammonium hydroxide solution and the crude solid amide which precipitated was filtered, washed with water, and dried by dissolving it in chloroform over anhydrous magnesium sulfate. Removal of solvent and recrystallization from isopropyl alcohol afforded 68.4 gm. (80.5%) of the amide (M.P. 100–103° C.). A second recrystallization from isopropyl alcohol-"Skellysolve B" with "Norit" (amorphous carbon) decolorization gave the product (M.P. 100.5–103.5° C.).

*Analysis.*—Calcd. for $C_{10}H_{12}BrNOS$: C, 43.80%; H, 4.41%; N, 5.11%. Found: C, 44.30%; H, 4.55%; N, 5.23%.

(d) α-(4-bromophenylthio)isobutyronitrile.—An intimate mixture of α-(4-bromophenylthio)isobutyramide (38.5 gm., 0.14 mol) and phosphorus pentoxide (38.5 gm.) was heated in a distillation apparatus under high vacuum. The nitrile distilled as a pale yellow oil (29.8 gm., B.P. 111–117° C. at 0.5 mm.). It crystallized upon standing and was recrystallized from "Skellysolve B" to obtain the product, α-(4 - bromophenylthio)isobutyronitrile, (M.P. 50–52° C.).

*Analysis.*—Calcd. for $C_{10}H_{10}BrNS$: C, 46.88%; H, 3.93%; N, 5.47%. Found: C, 46.89%; H, 4.20%; N, 5.33%.

EXAMPLE A–5.—PREPARATION OF p-CHLOROPHENYL-THIOACETONITRILE

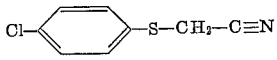

A mixture of p-chlorothiophenol (36.2 gm., 0.25 mol), chloroacetonitrile (18.7 gm., 0.25 mol), and anhydrous potassium carbonate (34.5 gm., 0.25 mol) in 75 ml. of dry acetone was refluxed for 5½ hours. The mixture was then poured into 200 ml. of water containing 10 gm. of sodium hydroxide. Ether extraction, drying of the extracts (MgSO₄) and removal of the solvent gave an orange crystalline solid. Recrystalliztion from isopropyl alcohol gave 37.78 gm. of the product p-chlorophenylthioacetonitrile in the form of light orange plates (M.P. 84.5–87° C.).

EXAMPLE A–6.—PREPARATION OF p-METHOXY-PHENYLTHIOACETONITRILE

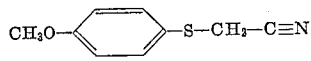

A mixture of p-methoxythiophenol (15 gm., 0.107 mol), chloroacetonitrile (8.3 gm., 0.11 mol), and anhydrous potassium carbonate (15.2 gm., 0.11 mol) in 50 ml. of dry acetone was refluxed for 6 hours. The mixture was then poured into 150 ml. of water containing 5 gm. of sodium hydroxide. Ether extraction, drying of the extracts (MgSO₄) and removal of the solvent gave 18.7 gm. of the product, p-methoxyphenylthioacetonitrile, in the form of a yellow oil.

EXAMPLE A–7.—PREPARATION OF o-CHLOROPHENYL-THIOACETONITRILE

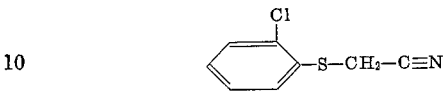

A mixture of o-chlorothiophenol (28.9 gm., 0.2 mol), chloroacetonitrile (15.1 gm., 0.2 mol), and anhydrous potassium carbonate (27.6 gm., 0.2 mol) in 60 ml. of dry acetone was refluxed for 7 hours. The mixture was then poured into 200 ml. of water containing 10 gm. of sodium hydroxide. Ether extraction, drying of the extracts (MgSO₄) and removal of the solvent gave an oil which, when distilled gave 29.3 gm. of the product, o-chlorophenylthioacetonitrile (B.P. 116 – 125° C./0.25 – 0.35 mm.).

EXAMPLE A–8.—PREPARATION OF p-FLUOROPHENYL-THIOACETONITRILE

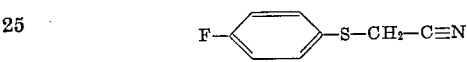

A mixture of p-fluorothiophenol (15 gm., 0.117 mol), chloroacetonitrile (8.83 gm., 0.117 mol), and anhydrous potassium carbonate (16.15 gm., 0.117 mol) in 50 ml. of dry acetone was refluxed for 8½ hours. The mixture was then poured into 200 ml. of water containing 10 gm. of sodium hydroxide. Ether extraction, drying of the extracts (MgSO₄) and removal of the solvent gave a yellow oil which crystallized upon standing. The solid and the oil recovered from the mother liquors were combined and mixed with 16 gm. of $P_2O_5$. The mixture was distilled in vacuo and 10.7 gm. of the product, p-fluorophenylthioacetonitrile, were obtained (B.P. 84–92° C./0.1 mm.).

EXAMPLE A–9.—PREPARATION OF m-CHLOROPHENYL-THIOACETONITRILE

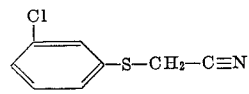

A mixture of m-chlorothiophenol (28.9 gm., 0.2 mol), chloroacetonitrile (15.1 gm., 0.2 mol), and anhydrous potassium carbonate (27.6 gm., 0.2 mol) in 60 ml. of dry acetone was refluxed for 5 hours. The mixture was then poured into 250 ml. of water containing 12.5 gm. of sodium hydroxide. Ether extraction, drying of the extracts (MgSO₄) and removal of the solvent gave a light brown oil which, upon cooling, crystallized. The crystals were dissolved in chloroform, and the solution treated with "Skellysolve B" until precipitation was complete (in an ice bath). The solid was filtered and dried under high vacuum to give 25.8 gm. of the product, m-chlorophenylthioacetonitrile (M.P. 50–52° C.).

EXAMPLE A–10.—PREPARATION OF α-(2-CHLORO-PHENYLTHIO)PROPIONITRILE

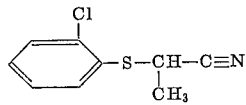

Sodium hydride (2.01 gm., 49 mmols of 58.6% dispersion in mineral oil) was added portion-wise with stirring to a cooled solution of o-chlorothiophenol (6.5 gm., 44.8 mmols) in 50 ml. of dry dimethylformamide. After hydrogen evolution had ceased, α-bromopropionitrile (6.0 gm., 44.8 mmols) was added dropwise, not allowing the reaction mixture temperature to rise above 35° C. It was then stirred at room temperature for 1¾ hours, poured into 200 ml. of 5% sodium hydroxide solution and extracted 3 times with ether. The ether extracts were washed twice with water and dried over anhydrous sodium sulfate. The ether was removed and the mineral oil was removed from the remaining oil by dissolving it in acetonitrile and extracting with 3 portions of n-pentane. Removal of the acetonitrile by evaporation in vacuo and distillation yielded a light brown oil (5.8 gm., B.P. 90–95° C. at 0.125 mm.). Redistillation yielded the product, α-(2-chlorophenylthio)propionitrile (B.P. 82.5–86° C. at 0.1 mm.).

*Analysis.*—Calcd. for $C_9H_8ClNS$: C, 54.68%; H, 4.08%; Cl, 17.94%; N, 7.08%; S, 16.22%. Found: C, 54.63%; H, 4.28%; Cl, 18.12%; N, 6.74%; S, 16.21%.

EXAMPLE A–11.—PREPARATION OF α-(4-METHOXYPHENYLTHIO)PROPIONITRILE

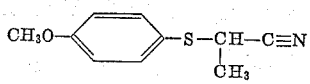

Sodium hydride (6.75 gm., 0.165 mol of 58.6% dispersion in mineral oil) was added portion-wise to a cooled solution of p-methoxythiophenol (21 gm., 0.15 mol) in 200 ml. of dry dimethylformamide. After hydrogen evolution had ceased, 2-bromopropionitrile (20 gm., 0.15 mol) was added dropwise, not allowing the reaction mixture temperature to rise above 35° C. The mixture was then stirred for 1½ hours at room temperature, and poured into 500 ml. of 5% sodium hydroxide solution. Ether extraction, drying of the ether extracts over anhydrous magnesium sulfate, and removal of the ether gave the crude product which was separated from the mineral oil by dissolving in acetonitrile, extracting with pentane to remove the mineral oil and evaporation of the acetonitrile. Distillation gave 22.5 gm. of the pure products, α-(4-methoxyphenylthio)propionitrile (B.P. 98–103° C. at 0.125–0.15 mm.).

*Analysis.*—Calcd. for $C_{10}H_{11}NOS$: C, 62.15%; H, 5.74%; N, 7.25%. Found: C, 61.65%; H, 5.73%; N, 7.36%.

EXAMPLE A–12.—PREPARATION OF α-(3-CHLOROPHENYLTHIO)PROPIONITRILE

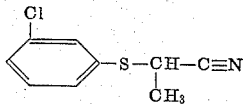

Sodium hydride (6.7 gm., 0.165 mol of 58.6% dispersion in mineral oil) was added portion-wise to a stirred and cooled solution of 3-chlorothiophenol (21.7 gm., 0.15 mol) in 200 ml. of dry dimethylformamide. After hydrogen evolution had subsided, α-bromopropionitrile (20.0 gm., 0.15 mol) was added dropwise and with stirring, not allowing the reaction temperature to exceed 25° C. The mixture was then stirred at room temperature for 2 hours, poured into 500 ml. of 5% sodium hydroxide solution, and extracted with ether. After washing with water, the ether extracts were dried (MgSO₄) and the ether was removed. Mineral oil was removed from the residue by the method described previously. Fractional distillation gave 20.37 gm. of material with B.P. 83–120° C. at 0.025–1.5 mm. Redistillation gave the pure product, α-(3-chlorophenylthio)propionitrile (18.49 gm., B.P. 80–85° C. at 0.03 mm.).

*Analysis.*—Calcd. for $C_9H_8ClNS$: C, 54.68%; H, 4.08%; N, 7.08%; S, 16.22%. Found: C, 54.39%; H, 4.11%; N, 7.25%; S, 16.41%.

EXAMPLE A–13.—PREPARATION OF m-TRIFLUOROMETHYLPHENYLTHIOACETONITRILE

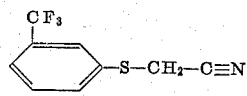

A mixture of m-trifluoromethylthiophenol (24.9 gm., 0.14 mol), anhydrous potassium carbonate (19.3 gm., 0.14 mol), and chloroacetonitrile (10.6 gm., 0.14 mol) in 100 ml. of dry acetone was stirred at reflux temperature for 3 hours. The mixture was then poured into 200 ml. of 5% sodium hydroxide solution, extracted with ether, and the ether extracts were washed with water, and dried over anhydrous sodium sulfate. Removal of the ether and distillation of the remaining oil gave 22.9 gm. of the pure product, m-trifluoromethylphenylthioacetonitrile (B.P. 83–86° C. at 0.03 mm.).

*Analysis.*—Calcd. for $C_9H_6F_3NS$: C, 49.77%; H, 2.78%; N, 6.45%. Found: C, 49.87%; H, 3.02%; N, 6.30%.

EXAMPLE A–14.—PREPARATION OF p-NITROPHENYLTHIOACETONITRILE

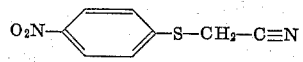

A mixture of p-nitrothiophenol (40.0 gm., 0.258 mol), chloroacetonitrile (19.5 gm., 0.258 mol), and anhydrous potassium carbonate (35.6 gm., 0.258 mol) in 100 ml. of dry acetone was stirred and refluxed for 4½ hours. The mixture was then poured into 500 ml. of 5% sodium hydroxide solution, extracted with ether, and the ether extracts were washed with water and dried over anhydrous sodium sulfate. Ether removal and distillation of the residual oil gave 29.4 gm. of the product as an amber oil (B.P. 158–170° C. at 0.075–0.2 mm.). Final purification was accomplished by evaporative distillation, and two recrystallizations from chloroform-"Skellysolve B," affording the pure product, p-nitrophenylthioacetonitrile, as a yellow solid (M.P. 83.5–85.5° C.).

*Analysis.*—Calcd. for $C_8H_6N_2O_2S$: C, 49.47%; H, 3.11%; N, 14.43%; S, 16.51%. Found: C, 49.38%; H, 3.17%; N, 14.54%; S, 16.46%.

EXAMPLE A–15

When, in the procedure of Example A–5, p-chlorothiophenol is replaced by an equal molar amount of 4-phenylthiophenol,
2,6-dichlorothiophenol,
4-trifluoromethylthiophenol,
4-benzylthiophenol,
4-methylthiophenol,
3-dimethylaminomethoxythiophenol,
3-propylthiophenol,
2-iodothiophenol,
2-trifluoromethylthiophenol,
3-ethoxythiophenol,
4-dimethylaminothiophenol,
4-diethylaminothiophenol,
3-fluoroethiophenol,
3-bromothiophenol,
3-phenoxythiophenol,
4-methylthiothiophenol,
3-methylthiophenol,
2-chloro-4-methylthiophenol,
2,4-dichlorothiophenol,
2,4,6-trichlorothiophenol,
2-methoxythiophenol and
3-methoxythiophenol, there are obtained, 4-phenylphenylthioacetonitrile,
2,6-dichlorophenylthioacetonitrile,
4-trifluoromethylphenylthioacetonitrile,
4-benzylphenylthioacetonitrile,
4-methylphenylthioacetonitrile,
3-dimethylaminomethoxyphenylthioacetonitrile,
3-propylphenylthioacetonitrile,
2-iodophenylthioacetonitrile,
2-trifluoromethylphenylthioacetonitrile,
3-ethoxyphenylthioacetonitrile,
4-dimethylaminophenylthioacetonitrile,
4-diethylaminophenylthioacetonitrile,
3-fluorophenylthioacetonitrile,
3-bromophenylthioacetonitrile, 3-phenoxyphenylthioacetonitrile,
4-methylthiophenylthioacetonitrile,
3-methylphenylthioacetonitrile,
2-chloro-4-methylphenylthioacetonitrile,
2,4-dichlorophenylthioacetonitrile,
2,4,6-trichlorophenylthioacetonitrile,
2-methoxyphenylthioacetonitrile, and
3-methoxyphenylthioacetonitrile, respectively.

EXAMPLE A–16

When, in the procedure of Example A–9, chloroacetonitrile is replaced by an equal molar amount of α-Chloroisobutyronitrile,
β-Chloropropionitrile,
γ-Chlorobutyronitrile,
β-Chlorobutyronitrile,
α-Chlorobutyronitrile,
δ-Chlorovaleronitrile,
γ-Chlorovaleronitrile,
β-Chlorovaleronitrile,
α-Chlorovaleronitrile,
α-Chloro-α-ethylbutyronitrile,
ζ-Chloroheptanonitrile, and
ε-Chlorohexanonitrile, there are obtained, α-(m-Chlorophenylthio)isobutyronitrile,
β-(m-Chlorophenylthio)propionitrile,
γ-(m-Chlorophenylthio)butyronitrile,
β-(m-Chlorophenylthio)butyronitrile,
α-(m-Chlorophenylthio)butyronitrile,
δ-(m-Chlorophenylthio)valeronitrile,
γ-(m-Chlorophenylthio)valeronitrile,
β-(m-Chlorophenylthio)valeronitrile,
α-(m-Chlorophenylthio)valeronitrile,
α-(m-Chlorophenylthio)-α-ethylbutyronitrile,
ζ-(m-Chlorophenylthio)heptanonitrile, and
ε-(m-Chlorophenylthio)hexanonitrile, respectively.

B. *Preparation of products*

EXAMPLE B–1.—PREPARATION OF 2-(p-CHLOROPHENYLTHIO)-2-(5'-TETRAZOLYL)PROPANE

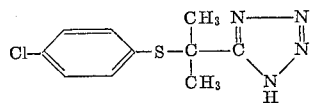

To a mixture of α-(4-chlorophenylthio)isobutyronitrile (22.3 gm., 0.105 mol.) and sodium azide (20.6 gm., 0.316 mol.), there was added a solution of aluminum chloride (15.5 gm., 0.116 mol.) in 400 ml. of dry tetrahydrofuran. The mixture was stirred and refluxed vigorously for 22 hours. After cooling, 400. ml. of water were added, and the tetrahydrofuran was removed by evaporation under reduced pressure. The residual aqueous suspension was acidified with concentrated hydrochloric acid and extracted 3 times with ether. The ether extracts were in turn extracted 3 times with an aqueous saturated sodium bicarbonate solution. Acidification of the bicarbonate extracts (hydrochloric acid), ether extraction, drying ($Na_2SO_4$) and removal of the ether afforded 19.0 gm. of the white crystalline product. Recrystallization from chloroform gave the pure product, 2-(p-chlorophenylthio)-2-(5'-tetrazolyl)propane (M.P. 180.5–183° C.).

*Analysis.*—Calcd. for $C_{10}H_{11}ClN_4S$: C, 47.15%; H, 4.35%; Cl, 13.92%; N, 22.00%. Found: C, 47.20%; H, 4.38%; Cl, 14.31%; N, 22.22%.

EXAMPLE B–2.—PREPARATION OF 5-(PHENYLTHIOMETHYL)TETRAZOLE

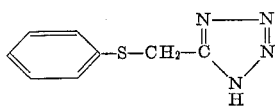

A mixture of phenylthioacetonitrile (22.4 gm., 0.15 mol.), sodium azide (10.7 gm., 0.165 mol.), and ammonium chloride (8.8 gm., 0.165 mol.) in 100 ml. of dimethylformamide was stirred and heated at 120° C. for 21½ hours.

The dimethylformamide was removed under reduced pressure on a steam bath and 250 ml. of distilled water was added to the residue. The residual aqueous suspension was acidified with concentrated hydrochloric acid. An oily precipitate which subsequently crystallized was obtained. Crystallization from aqueous ethanol afforded 23.3 gm. of the product as white crystals (M.P. 113–115° C.). Recrystallization from chloroform gave the product, 5-(phenylthiomethyl)tetrazole (M.P. 114–116° C.), whose infrared and NMR spectra were consistent with the structure.

*Analysis.*—Calcd. for $C_8H_8N_4S$: C, 49.98%; H, 4.19%; N, 29.15%; S, 16.68%. Found: C, 49.89%; H, 4.26%; N, 29.05%; S, 16.80%.

EXAMPLE B–3.—PREPARATION OF 1-(p-CHLOROPHENYLTHIO)-1-(5-TETRAZOLYL)ETHANE

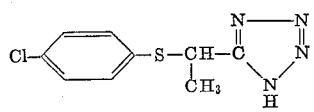

A mixture of α-(4-chlorophenylthio)propionitrile (13.6 gm., 68.8 mmols.), sodium azide (4.92 gm., 75.7 mmols.), and ammonium chloride (4.0 gm., 75.7 mmols.) in 300 ml. of dimethylformamide was stirred at 100–108° C. for 16 hours. The dimethylformamide was removed under reduced pressure on a steam bath, and 200 ml. of distilled water was added to the residue whereby a precipitate was formed. The mixture was acidified with concentrated hydrochloric acid, and the solid separated by filtration and washed with water. A solution-suspension of the solid in ether was evaporated under reduced pressure, chloroform added and evaporated to remove any water. Recrystallization from isopropyl alcohol gave 14.06 gm. of the solid (M.P. 169.5–171° C.). Recrystallization from isopropyl alcohol yielded the product, 1-(p-chlorophenylthio)-1-(5-tetrazolyl)ethane (M.P. 169–170.5° C.).

*Analysis.*—Calcd. for $C_9H_9ClN_4S$: C, 44.91%; H, 3.77%; Cl, 14.73%; N, 23.28%; S, 13.32%. Found: C, 45.14%; H, 3.89%; Cl, 15.19%; N, 23.47%; S, 13.32%.

EXAMPLE B–4.—PREPARATION OF 2-(p-BROMOPHENYLTHIO)-2-(5-TETRAZOLYL)PROPANE

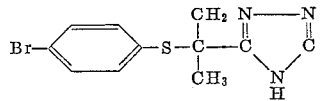

A mixture of α-(4-bromophenylthio)isobutyronitrile (23.0 gm., 0.09 mol), sodium azide (6.5 gm., 0.1 mol), and ammonium chloride (5.35 gm., 0.1 mol) in 100 ml. of dimethylformamide was stirred at 90° C. for 22 hours. The mixture was poured into 650 ml. of cold water, and acidified with 6 N sulfuric acid. The resulting white precipitate was filtered, dried over $P_2O_5$ in vacuo and yielded 26.0 gm. of the crude tetrazole (M.P. 175–178° C.). Recrystallization from chloroform gave the product, 2 - (p-bromophenylthio)-2-(5-tetrazolyl)propane (M.P. 192.5–194.5° C.).

*Analysis.*—Calcd. for $C_{10}H_{11}BrN_4S$: C, 40.14%; H, 3.71%; N, 18.73%; Br, 26.71%. Found: C, 40.13%; H, 3.79%; N, 18.84%; Br, 26.85%.

EXAMPLE B–5.—PREPARATION OF 5-(p-CHLOROPHENYLTHIOMETHYL)TETRAZOLE

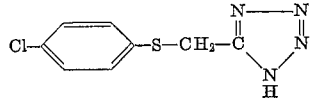

A mixture of p-chlorophenylthioacetonitrile (25.0 gm., 0.136 mol), sodium azide (9.11 gm., 0.14 mol), and ammonium chloride (7.5 gm., 0.14 mol) in 125 ml. of dimethylformamide was heated at 100° C. with stirring for 20 hours. Most of the dimethylformamide was flashed off in vacuo and the residue was poured into 1000 ml. of cold water and acidified with 6 N sulfuric acid. After cooling in an ice bath, the precipitated tetrazole was filtered and recrystallized from ethanol-water, affording 25.3 gm. of the product (M.P. 158–159° C.). A second recrystallization from ethanol-water afforded the product, 5-(p-chlorophenylthiomethyl)tetrazole (M.P. 157–159° C.).

*Analysis.*—Calcd. for $C_8H_7ClN_4S$: C, 42.38%; H, 3.12%; N, 24.72%. Found: C, 42.31%; H, 3.22%; N, 24.71%.

EXAMPLE B–6.—PREPARATION OF 5-(p-METHOXY-PHENYLTHIOMETHYL)TETRAZOLE

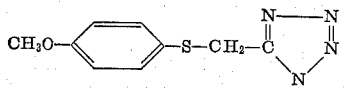

A mixture of p-methoxyphenylthioacetonitrile (18.7 gm., 0.104 mol), sodium azide (7.15 gm., 0.11 mol), and ammonium chloride (5.88 gm., 0.11 mol) in 100 ml. of dimethylformamide was stirred at 100–110° C. for 18 hours. The mixture was poured into water and acidified with 6 N sulfuric acid. The crude tetrazole precipitated upon cooling as an orange solid. Recrystallization from isopropyl alcohol (with "Norit" treatment) yielded 18.2 gm. of the tetrazole (M.P. 133–135° C.). Recrystallization from isopropyl alcohol afforded the product, 5-(p-methoxyphenylthiomethyl)tetrazole (M.P. 137–141° C.).

*Anaylsis.*— Calcd. for $C_9H_{10}N_4OS$: C, 48.63%; H, 4.54%; N, 25.21%. Found: C, 49.02%; H, 4.76%; N, 25.19%.

EXAMPLE B–7.—PREPARATION OF 5-(o-CHLORO-PHENYLTHIOMETHYL)TETRAZOLE

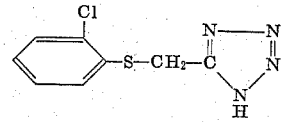

A mixture of o-chlorophenylthioacetonitrile (29.3 gm., 0.16 mol), sodium azide (11.4 gm., 0.175 mol), and ammonium chloride (9.4 gm., 0.175 mol) in 500 ml. of dimethylformamide was stirred and heated at 100–110° C. for 22 hours. The mixture was then evaporated under reduced pressure to remove the dimethylformamide, and the residue was dissolved in 250 ml. of water and acidified with concentrated hydrochloric acid. The resultant oil crystallized upon cooling, and the solid was recrystallized from chloroform, yielding 26.0 gm. of the tetrazole (M.P. 103.5–105° C.). Recrystallization from chloroform gave the product, 5-(o-chlorophenylthiomethyl)tetrazole (M.P. 104–107° C.).

*Analysis.*—Calcd. for $C_8H_7ClN_4S$: C, 42.39%; H, 3.11%; Cl, 15.64%; N, 24.72%; S, 14.14%. Found: C, 42.62%; H, 3.28%; Cl, 15.86%; N, 24.57%; S, 14.03%.

EXAMPLE B–8.—PREPARATION OF 5-(p-FLUORO-PHENYLTHIOMETHYL)TETRAZOLE

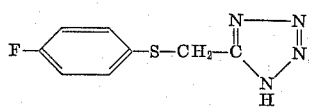

A mixture of p-fluorophenylthioacetonitrile (8.0 gm., 47.8 mmols), sodium azide (3.26 gm., 50 mmols), and ammonium chloride (2.68 gm., 50 mmols) in 100 ml. of dimethylformamade was stirred at 105° C. for 11 hours. The mixture was poured into ice water and acidified with 6 N sulfuric acid. The crude tetrazole precipitated as white crystals and subsequent drying in vacuo over $P_2O_5$ yielded 7.7 gm. of the crude product (M.P. 135–138° C.). Recrystallization from chloroform afforded the product, 5-(p-fluorophenylthiomethyl)tetrazole, (M.P. 137.5–139° C.).

*Analysis.*—Calcd. for $C_8H_7FN_4S$: C, 45.70%; H, 3.36%; N, 26.65%. Found: C, 45.76%; H, 3.45%; N, 26.37%.

EXAMPLE B–9.—PREPARATION OF 5-(m-CHLORO-PHENYLTHIOMETHYL)TETRAZOLE

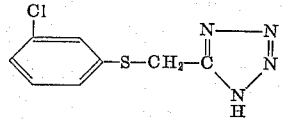

A mixture of m-chlorophenylthioacetonitrile (18.4 gm., 0.1 mol), sodium azide (7.2 gm., 0.11 mol), and ammonium chloride (5.9 gm., 0.11 mol) in 250 ml. of dimethylformamide was stirred and heated at 110–115° C. for 18 hours. The dimethylformamide was evaporated under reduced pressure, and 200 ml. of water was added to the residue. The residual aqueous suspension was acidified with concentrated hydrochloric acid. The mixture was extracted 3 times with ether. The combined extracts were washed with water, dried over anhydrous sodium sulfate, and evaporated under reduced pressure to give 19.7 gm. of the product (M.P. 126–128° C.). Recrystallization from isopropyl alcohol gave the product, 5-(m-chlorophenylthiomethyl)tetrazole (M.P. 126–128° C.).

*Analysis.*—Calcd. for $C_8H_7ClN_4S$: C, 42.39%; H, 3.11%; Cl, 15.64%; N, 24.72%; S, 14.14%. Found: C, 42.74%; H, 3.28%; Cl, 15.84%; N, 24.79%; S, 14.20%.

EXAMPLE B–10.—PREPARATION OF 1-(o-CHLORO-PHENYLTHIO)-1-(5-TETRAZOLYL)ETHANE

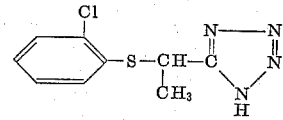

A mixture of α-(2-chlorophenylthio)propionitrile (4.18 gm., 21.1 mmols), sodium azide (1.51 gm., 23.2 mmols), and ammonium chloride (1.24 gm., 23.2 mmols) in 50 ml. of dimethylformamide was stirred at 110–115° C. for 15 hours. The mixture was then evaporated under reduced pressure to remove the dimethylformamide, and the residue was dissolved in 100 ml. of water, and acidified with concentrated hydrochloric acid. The acidic suspension was extracted 3 times with ether. The combined extracts were washed with water, dried over anhydrous sodium sulfate, and evaporated under reduced pressure to give 4.94 gm. of the tetrazole (M.P. 110–113° C.). Recrystallization from chloroform-carbon tetrachloride gave the product, 1-(o-chlorophenylthio)-1-(5-tetrazolyl)ethane (M.P. 114.5–115.5° C.).

*Analysis.*—Calcd. for $C_9H_9ClN_4S$: C, 44.91%; H, 3.77%; N, 23.28%; S, 13.32%. Found: C, 45.23%; H, 3.97%; N, 23.26%; S, 13.31%.

EXAMPLE B–11.—PREPARATION OF 1-(p-METHOXY-PHENYLTHIO)-1-(5-TETRAZOLYL)ETHANE

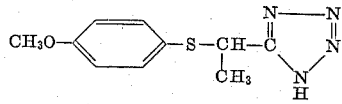

A mixture of α-(4-methoxyphenylthio)propionitrile (3.32 gm., 17.2 mmols), sodium azide (1.23 gm., 18.9 mmols), and ammonium chloride (1.01 gm., 18.9 mmols) in 50 ml. of dimethylformamide was stirred at 100° C. for 18 hours. The mixture was then evaporated under reduced pressure to remove the dimethylformamide, and the residue was dissolved in 150 ml. of water, and acidified with concentrated hydrochloric acid. The acidic suspension was extracted 3 times with ether. The combined extracts were evaporated under reduced pressure and yielded 3.9 gm. of the crude tetrazole. Recrystallization from ethyl acetate, followed by two additional recrystallizations from isopropyl alcohol gave the product, 1-(p-methoxyphenylthio)-1-(5-tetrazolyl)ethane (M.P. 155–158° C.).

*Analysis*.—Calcd. for $C_{10}H_{12}N_4OS$: C, 50.83%; H, 5.12%; N, 23.71%; S, 13.57%. Found: C, 50.80%; H, 5.15%; N, 24.01%; S, 13.50%.

EXAMPLE B–12.—PREPARATION OF 1-(m-CHLOROPHENYLTHIO)-1-(5-TETRAZOLYL)ETHANE

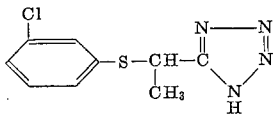

A mixture of α-(3-chlorophenylthio)propionitrile (14.35 gm., 72.6 mmols), sodium azide (5.19 gm., 79.8 mmols), and ammonium chloride (4.27 gm., 79.8 mmols) in 250 ml. of dimethylformamide was stirred and heated at 100° C. for 21 hours. The dimethylformamide was stripped off, and the residue was suspended in 250 ml. of water, and acidified with concentrated hydrochloric acid. The mixture was extracted with ether, the ether extracts were dried and the ether removed. The resultant crude solid was recrystallized from chloroform-carbon tetrachloride to give 14.1 gm. of the crude tetrazole (M.P. 114.5–115.5° C.). Further recrystallizations from chloroform and isopropyl alcohol gave the product, 1-(m-chlorophenylthio)-1-(5-tetrazolyl)ethane (M.P. 115–116.5° C.).

*Analysis*.—Calcd. for $C_9H_9ClN_4S$: C, 44.91%; H, 3.77%; N, 23.28%; S, 13.32%. Found: C, 45.27%; H, 3.95%; N, 23.73%; S, 13.30%.

EXAMPLE B–13.—PREPARATION OF 5-(3-TRIFLUOROMETHYLPHENYLTHIOMETHYL)TETRAZOLE

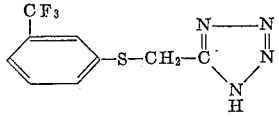

A mixture of m-trifluoromethylphenylthioacetonitrile (19.78 gm., 0.09 mol), sodium azide (6.5 gm., 0.10 mol), and ammonium chloride (5.4 gm., 0.1 mol) in 50 ml. of dimethylformamide was stirred and heated at 105° C. for 18 hours. The mixture was then evaporated under reduced pressure to remove the dimethylformamide and the residue was dissolved in 100 ml. of water, and acidified with concentrated hydrochloric acid. The acidic suspension was extracted 3 times with ether. The combined extracts were extracted twice with saturated aqueous sodium bicarbonate solutions. The combined extracts were acidified with concentrated hydrochloric acid and extracted twice with chloroform. The combined chloroform extracts were washed with water and dried over anhydrous sodium sulfate, and evaporated under reduced pressure to give a brown viscous oil. Recrystallization from benzene-"Skellysolve B" yielded 14.3 gm. of the product. A second recrystallization from benzene gave the product, 5-(3-trifluoromethylphenylthiomethyl)tetrazole (M.P. 96.5–98.5° C.).

*Analysis*.—Calc'd for $C_9H_7F_3N_4S$: C, 41.54%; H, 2.71%; N, 21.33%. Found: C, 41.65%; H, 2.86%; N, 21.49%.

EXAMPLE B–14.—PREPARATION OF 5-(p-NITROPHENYLTHIOMETHYL)TETRAZOLE

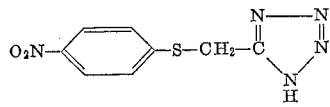

A mixture of p-nitrophenylthioacetonitrile (25.0 gm., 0.129 mol), sodium azide (9.2 gm., 0.142 mol), and ammonium chloride (7.6 gm., 0.142 mol) in 200 ml. of dimethylformamide was stirred and heated at 100–120° C. for 18 hours. The mixture was then evaporated under reduced pressure to remove the dimethylformamide, and the residue was suspended in 250 ml. of water and acidified with concentrated hydrochloric acid. The acidic suspension was extracted 3 times with ether. The combined extracts were washed twice with water, dried over anhydrous sodium sulfate and evaporated under reduced pressure to give 22.2 gm. of brown solid. Recrystallization (with decolorization) from ethyl acetate and two further recrystallizations from isopropyl alcohol afforded the product, 5-(p-nitrophenylthiomethyl)tetrazole (M.P. 151–153° C.).

*Analysis*.—Calc'd for $C_8H_7N_5O_2S$: C, 40.50%; H, 2.97%; N, 29.52%; S, 13.52%. Found: C, 40.89%; H, 3.20%; N, 29.67%; S, 13.23%.

EXAMPLE B–15

When, in the procedure of Example B–9, m-chlorophenylthioacetonitrile is replaced by an equal molar amount of each of the products of Example A–15, there are obtained, 5-(4-phenylphenylthiomethyl)tetrazole,
5-(2,6-dichlorophenylthiomethyl)tetrazole,
5-(4-trifluoromethylphenylthiomethyl)tetrazole,
5-(4-benzylphenylthiomethyl)tetrazole,
5-(4-methylphenylthiomethyl)tetrazole,
5-(3-dimethylaminomethoxyphenylthiomethyl)tetrazole,
5-(3-propylphenylthiomethyl)tetrazole,
5-(2-iodophenylthiomethyl)tetrazole,
5-(2-trifluoromethylphenylthiomethyl)tetrazole,
5-(3-ethoxyphenylthiomethyl)tetrazole,
5-(4-dimethylaminophenylthiomethyl)tetrazole,
5-(4-diethylaminophenylthiomethyl)tetrazole,
5-(3-fluorophenylthiomethyl)tetrazole,
5-(3-bromophenylthiomethyl)tetrazole,
5-(3-phenoxyphenylthiomethyl)tetrazole,
5-(4-methylthiophenylthiomethyl)tetrazole,
5-(3-methylphenylthiomethyl)tetrazole,
5-(2-chloro-4-methylphenylthiomethyl)tetrazole,
5-(2,4-dichlorophenylthiomethyl)tetrazole,
5-(2,4,6-trichlorophenylthiomethyl)tetrazole,
5-(2-methoxyphenylthiomethyl)tetrazole, and
5-(3-methoxyphenylthiomethyl)tetrazole, respectively.

EXAMPLE B–16

When, in the procedure of Examples B–9, m-chlorophenylthioacetonitrile is replaced by an equal molar amount of each of the products of Example A–16, there are obtained, 2-(m-chlorophenylthio)-2-(5-tetrazolyl)propane,
1-(m-chlorophenylthio)-2-(5-tetrazolyl)ethane,
1-(m-chlorophenylthio)-3-(5-tetrazolyl)propane,
2-(m-chlorophenylthio)-3-(5-tetrazolyl)propane,
1-(m-chlorophenylthio)-1-(5-tetrazolyl)propane,
1-(m-chlorophenylthio)-4-(-tetrazolyl)butane,
2-(m-chlorophenylthio)-4-(5-tetrazolyl)butane,
3-(m-chlorophenylthio)-4-(5-tetrazolyl)butane,
1-(m-chlorophenylthio)-1-(5-tetrazolyl)butane,
3-(m-chlorophenylthio)-3-(5-tetrazolyl)pentane,
1-(m-chlorophenylthio)-6-(5-tetrazolyl)heptane, and
1-(m-chlorophenylthio)-5-(5-tetrazolyl)hexane, respectively.

EXAMPLE B–17.—PREPARATION OF 5-(p-CHLOROBENZENESULFONYLMETHYL)TETRAZOLE

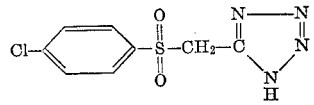

To a slurry of 5-(p-chlorophenylthiomethyl)tetrazole (5.0 gm., 22 mol) in 50 ml. of glacial acetic acid was added 7.48 gm. (66 mmol) of 30% hydrogen peroxide solution, and the mixture was heated on a steam bath for 2 hours. The mixture was then cooled and poured into 200 ml. of water. The white precipitate was filtered and dried, yielding 3.6 gm. of crude product. Recrystallization from isopropyl alcohol afforded the product, 5-(p-chlorobenzenesulfonylmethyl)tetrazole (M.P. 213.5–215° C.).

*Analysis.*—Calc'd for $C_8H_7ClN_4O_2S$: C, 37.14%; H, 2.73%; N, 21.66%; S, 12.39. Found: C, 37.63%; H, 2.89%; N, 21.67%; S, 12.55%.

EXAMPLE B–18

When, in the procedure of Example B–17, 5-(p-chlorophenylthiomethyl) tetrazole is replaced by an equal molar amount of each of the products of Examples B–1, B–2, B–3, B–4, B–6, B–7, B–8, B–9, B–10, B–11, B–12, B–13, B–14, B–15 and B–16, there are obtained, 2-(p-chlorobenzenesulfonyl)-2-(5'-tetrazolyl)propane,
5-(benzenesulfonylmethyl)tetrazole,
1-(p-chlorobenzenesulfonyl)-1-(5-tetrazolyl)ethane,
2-(p-bromobenzenesulfonyl)-2-(5-tetrazolyl)propane,
5-(p-methoxybenzenesulfonylmethyl)tetrazole,
5-(o-chlorobenzenesulfonylmethyl)tetrazole,
5-(p-fluorobenzenesulfonylmethyl)tetrazole,
5-(m-chlorobenzenesulfonylmethyl)tetrazole,
1-(o-chlorobenzenesulfonyl)-1-(5-tetrazolyl)ethane,
1-(p-methoxylbenzenesulfonyl)-1-(5-tetrazolyl)ethane,
1-(m-chlorobenzenesulfonyl)-1-(5-tetrazolyl)ethane,
5-(3-trifluoromethylbenzenesulfonylmethyl)tetrazole,
5-(p-nitrobenzenesulfonylmethyl)tetrazole,
5-(4-phenylbenzenesulfonylmethyl)tetrazole,
5-(2,6-dichlorobenzenesulfonylmethyl)tetrazole,
5-(4-trifluoromethylbenzenesulfonylmethyl)tetrazole,
5-(4-benzylbenzenesulfonylmethyl)tetrazole,
5-(4-methylbenzenesulfonylmethyl)tetrazole,
5-(3-dimethylaminomethoxybenzenesulfonylmethyl) tetrazole,
5-(3-propylbenzenesulfonylmethyl)tetrazole,
5-(2-iodobenzenesulfonylmethyl)tetrazole,
5-(2-trifluoromethylbenzenesulfonylmethyl)tetrazole,
5-(3-ethoxybenzenesulfonylmethyl)tetrazole,
5-(4-dimethylaminobenzenesulfonylmethyl)tetrazole,
5-(4-diethylaminobenzenesulfonylmethyl)tetrazole,
5-(3-fluorobenzenesulfonylmethyl)tetrazole,
5-(3-bromobenzenesulfonylmethyl)tetrazole,
5-(3-phenoxybenzenesulfonylmethyl)tetrazole,
5-(4-methylthiobenzenesulfonylmethyl)tetrazole,
5-(3-methylbenzenesulfonylmethyl)tetrazole,
5-(2-chloro-4-methylbenzenesulfonylmethyl)tetrazole,
5-(2,4-dichlorobenzenesulfonylmethyl)tetrazole,
5-(2,4,6-trichlorobenzenesulfonylmethyl)tetrazole,
5-(2-methoxybenzenesulfonylmethyl)tetrazole,
5-(3-methoxybenzenesulfonylmethyl)tetrazole,
2-(m-chlorobenzenesulfonyl)-2-(5-tetrazolyl)propane,
1-(m-chlorobenzenesulfonyl)-2-(5-tetrazolyl)ethane,
1-(m-chlorobenzenesulfonyl)-3-(5-tetrazolyl)propane,
2-(m-chlorobenzenesulfonyl)-3-(5-tetrazolyl)propane,
1-(m-chlorobenzenesulfonyl)-1-(5-tetrazolyl)propane,
1-(m-chlorobenzenesulfonyl)-4-(5-tetrazolyl)butane,
2-(m-chlorobenzenesulfonyl)-4-(5-tetrazolyl)butane,
3-(m-chlorobenzenesulfonyl)-4-(5-tetrazolyl)butane,
1-(m-chlorobenzenesulfonyl)-1-(5-tetrazolyl)butane,
3-(m-chlorobenzenesulfonyl)-3-(5-tetrazolyl)pentane,
1-(m-chlorobenzenesulfonyl)-6-(5-tetrazolyl)heptane, and
1-(m-chlorobenzenesulfonyl)-5-(5-tetrazolyl)hexane, respectively.

EXAMPLE B–19.—PREPARATION OF 5-(p-CHLOROBENZENESULFINYLMETHYL)TETRAZOLE

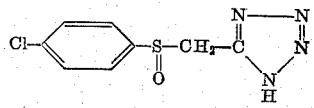

To a slurry of 5-(p-chlorophenylthiomethyl)tetrazole (5.0 gm., 22 mmols) in 50 ml. of glacial acetic acid is added 7.48 gm. (66 mmols) of 30% hydrozen peroxide solution, and the mixture mixed at room temperature for 2 hours. The mixture is then poured into 200 ml. of water. The precipitate is filtered and dried, yielding the product, 5-(p-chlorobenzenesulfinylmethyl)tetrazole.

EXAMPLE B–20

When, in the procedure of Example B–19, 5-(p-chlorophenylthiomethyl)tetrazole is replaced by an equal molar amount of each of the products of Examples B–1, B–2, B–3, B–4, B–6, B–7, B–8, B–9, B–10, B–11, B–12, B–13, B–14, B–15 and B–16, there are obtained, 2-(p-chlorobenzenesulfinyl)-2-(5'-tetrazolyl)propane,
5-(benzenesulfinylmethyl)tetrazole,
1-(p-chlorobenzenesulfinyl)-1-(5-tetrazolyl)ethane,
2-(p-bromobenzenesulfinyl)-2-(5-tetrazolyl)propane,
5-(p-methoxybenezenesulfinylmethyl)tetrazole,
5-(o-chlorobenzenesulfinylmethyl)tetrazole,
5-(p-fluorobenezenesulfinylmethyl)tetrazole,
5-(m-chlorobenzenesulfinylmethyl)tetrazole,
1-(o-chlorobenzenesulfinyl)-1-(5-tetrazolyl)ethane,
1-(p-methoxybenzenesulfinyl)-1-(5-tetrazolyl)ethane,
1-(m-chlorobenzenesulfinyl)-1-(5-tetrazolyl)ethane,
5-(3-trifluoromethylbenzenesulfinylmethyl)tetrazole,
5-(p-nitrobenzenesulfinylmethyl)tetrazole,
5-(4-phenylbenzenesulfinylmethyl)tetrazole,
5-(2,6-dichlorobenzenesulfinylmethyl)tetrazole,
5-(4-trifluoromethylbenzenesulfinylmethyl)tetrazole,
5-(4-benzylbenzenesulfinylmethyl)tetrazole,
5-(4-methylbenzenesulfinylmethyl)tetrazole,
5-(3-dimethylaminomethoxybenzenesulfinylmethyl) tetrazole,
5-(3-propylbenzenesulfinylmethyl)tetrazole,
5-(2-iodobenzenesulfinylmethyl)tetrazole,
5-(2-trifluoromethylbenzenesulfinylmethyl)tetrazole,
5-(3-ethoxybenzenesulfinylmethyl)tetrazole,
5-(4-dimethylaminobenzenesulfinylmethyl)tetrazole,
5-(4-diethylaminobenzenesulfinylmethyl)tetrazole,
5-(3-fluorobenzenesulfinylmethyl)tetrazole,
5-(3-bromobenzenesulfinylmethyl)tetrazole,
5-(3-phenoxybenzenesulfinylmethyl)tetrazole,
5-(4-methoxythiobenzenesulfinylmethyl)tetrazole,
5-(3-methylbenzenesulfinylmethyl)tetrazole,
5-(2-chloro-4-methylbenzenesulfinylmethyl)tetrazole,
5-(2,4-dichlorobenzenesulfinylmethyl)tetrazole,
5-(2,4,6-trichlorobenzenesulfinylmethyl)tetrazole,
5-(2-methoxybenzenesulfinylmethyl)tetrazole,
5-(3-methoxybenzenesulfinylmethyl)tetrazole,
2-(m-chlorobenzenesulfinyl)-2-(5-tetrazolyl)propane,
1-(m-chlorobenzenesulfinyl)-2-(5-tetrazolyl)ethane,
1-(m-chlorobenzenesulfinyl)-3-(5-tetrazolyl)propane,
2-(m-chlorobenzenesulfinyl)-3-(5-tetrazolyl)propane,
1-(m-chlorobenzenesulfinyl)-1-(5-tetrazolyl)propane,
1-(m-chlorobenzenesulfinyl)-4-(5-tetrazolyl)butane,
2-(m-chlorobenzenesulfinyl)-4-(5-tetrazolyl)butane,
3-(m-chlorobenzenesulfinyl)-4-(5-tetrazolyl)butane,
1-(m-chlorobenzenesulfinyl)-1-(5-tetrazolyl)butane,
3-(m-chlorobenzenesulfinyl)-3-(5-tetrazolyl)pentane,
1-(m-chlorobenzenesulfinyl)-6-(5-tetrazolyl)heptane, and
1-(m-chlorobenzenesulfinyl)-5-(5-tetrazolyl)hexane, respectively.

EXAMPLE B–21.—PREPARATION OF SODIUM 5-(3-CHLOROPHENYLTHIOMETHYL)TETRAZOLE

5 - (3 - chlorophenylthiomethyl)tetrazole (30.0 gm., 0.1323 mol) was dissolved in 300 ml. of 95% ethanol.

The pH of the solution was adjusted to 7 using 6% aqueous NaOH solution, and the solution was evaporated under reduced pressure. After the ethanol and water had been removed, benzene was twice added and removed under reduced pressure. The residue was dried in vacuo for 17 hours to give 32.8 gm. of the product, sodium 5-(3-chlorophenylthiomethyl)tetrazole.

While this invention has been described and exemplified in terms of its preferred embodiment, those skilled in the art will appreciate that modifications can be made without departing from the spirit and scope of this invention.

What is claimed is:

1. A compound selected from the group consisting of compounds of the formula

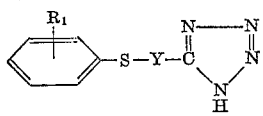

wherein
R$^1$ is a member selected from the group consisting of chloro, bromo, fluoro, iodo, trifluoromethyl, and
Y is (lower)alkylene;
and the pharmaceutically acceptable nontoxic salts thereof.

2. A compound of claim 1 having the formula

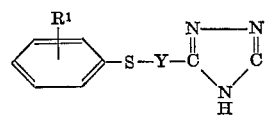

wherein
R$^1$ is a member selected from the group consisting of chloro, bromo, fluoro, iodo, trifluoromethyl, and
Y is (lower)alkylene.

3. The compound of claim 1 having the formula

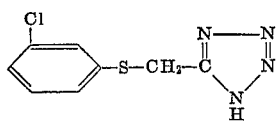

4. A pharmaceutically acceptable nontoxic salt of the compound of claim 3.

5. The compound of claim 1 having the formula

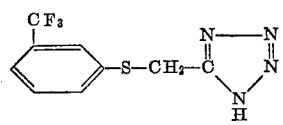

6. The compound of claim 1 having the formula

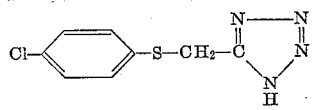

7. The compound of claim 1 having the formula

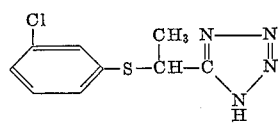

8. The compound of claim 1 having the formula

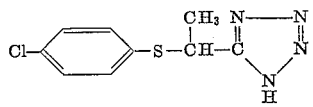

9. The compound of claim 1 having the formula

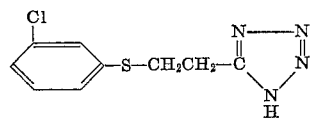

10. The compound of claim 1 having the formula

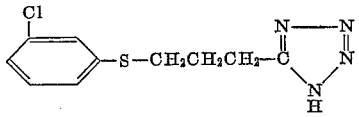

11. The compound of claim 1 having the formula

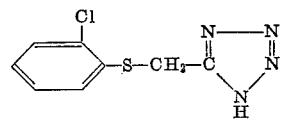

References Cited

UNITED STATES PATENTS 3,097,139    7/1963    Thorp  ---------- 167—65.5

OTHER REFERENCES

Burger: Medicinal Chemistry (New York, 1960), pages 77–78.

Lowy et al.: Introduction to Organic Chemistry (New York, 1945), pages 213–214.

McManus et al.: J. Org. Chem., vol. 24, pages 1464–7 (1959).

Yale: J. Med. Pharm. Chem., vol. 1, pages 121–133 (1959).

ALEX MAZEL, *Primary Examiner.*

ALTON D. ROLLINS, *Assistant Examiner.*

CERTIFICATE OF CORRECTION

Patent No. 3,337,576                                         August 22, 1967

Ronald Leslie Buchanan et al.

It is hereby certified that error appears in the above numbered patent requiring correction and that the said Letters Patent should read as corrected below.

column 1, line 16, for "compunds." read -- compounds. --; column 5, line 72, for "Ethyl-(4-chlorophenylthio)proprionate", in italics, read -- Ethyl α-(4-chlorophenylthio)propionate --, in italics; column 6, line 44, for "H, 4,87%;" read -- H, 4.87%; --; column 15, line 56, for "soīutions." read -- solution. --; column 18, line 9, for "hydrozen" read -- hydrogen --; column 19, lines 29 to 34, for the right-hand portion of the formula reading

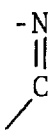               read               

Signed and sealed this 15th day of October 1968.

(SEAL)
Attest:

EDWARD M. FLETCHER, JR.                          EDWARD J. BRENNER
Attesting Officer                                        Commissioner of Patents